United States Patent [19]

Novak

[11] Patent Number: 4,750,213

[45] Date of Patent: Jun. 7, 1988

[54] METHOD AND SYSTEM FOR EDITING UNWANTED PROGRAM MATERIAL FROM BROADCAST SIGNALS

[76] Inventor: Albert P. Novak, Box 107, Goldens Bridge, N.Y. 10526

[21] Appl. No.: 872,627

[22] Filed: Jun. 9, 1986

Related U.S. Application Data

[63] Continuation-in-part of Ser. No. 575,859, Feb. 1, 1984, abandoned.

[51] Int. Cl.$^4$ ............................................. H04B 17/00
[52] U.S. Cl. ...................................... 455/67; 358/908; 358/139
[58] Field of Search .................. 455/2, 67, 68, 69, 70; 358/84, 139, 908

[56] References Cited

U.S. PATENT DOCUMENTS

| | | | |
|---|---|---|---|
| 3,919,479 | 11/1975 | Moon et al. | 455/67 |
| 4,230,990 | 10/1980 | Lert, Jr. et al. | 455/67 |
| 4,305,101 | 12/1981 | Yarbrough et al. | 358/908 |
| 4,390,904 | 6/1983 | Johnston et al. | 358/908 |
| 4,420,769 | 12/1983 | Novak | 455/2 |
| 4,450,531 | 5/1984 | Kenyon et al. | 358/84 |
| 4,520,404 | 5/1985 | Von Kohorn | 358/908 |

*Primary Examiner*—Michael A. Masinick

[57] ABSTRACT

An improved method and system for the editing of unwanted content from transmitted program material. The system may be operated manually or automatically and its program recognition means may be positioned either locally at the controlled receiver or in a remote location. The system also has expanded editing capability to allow coordinated control of accessory devices and may be programmed without the necessity of an initial reception of unwanted content at the controlled receiver. It also simplifies and improves the reliability of previously disclosed methods for automatic program identification.

8 Claims, 2 Drawing Sheets

METHOD AND SYSTEM FOR EDITING UNWANTED PROGRAM MATERIAL FROM BROADCAST SIGNALS

This is a continuation in part of application Ser. No. 06/575,859, filed 2/01/84 now abandoned.

BACKGROUND OF THE INVENTION

1. Field of the Invention

This invention relates generally to a method by which broadcast programs can be edited after transmission and more particularly to an improved method for accomplishing the recognition and categorization of program segments and for causing the editing of program material to occur upon recognition of material categorized as unwanted.

The term "program" as used herein is defined in the generic sense and may include the complete content or any individual segment or segments of any type of program identity, such as entertainment broadcasts, commercials, news programs skits or the like, which are broadcast via television or radio. There are many needs for field editing such programs, such as in the removal of commercial announcement segments from news or entertainment programs, either upon initial reception or when taping to preserve such programs for subsequent viewing and/or listening. Another need is for blocking the receipt of programs or segments deemed to contain objectionable content, as in preventing children from watching and/or listening to (henceforth for simplicity, referred to as "monitoring") inappropriate programming.

2. Description of the Prior Art

A previous method and system for the editing of broadcast programs after transmission is disclosed in a previous invention by this applicant (U.S. Pat. No. 4,420,769) wherein automatic recognition of unwanted program material is accomplished by a system which analyzes the program content of broadcast signals in such a way that that program content is caused to supply its own essentially unique code or signature. This code is compared to codes previously programmed, by storage in one or more memories, as representing material to be edited, and when it is found that the code generated matches or substantially matches a previously stored code, editing is caused to occur. This code or signature is also commonly referred to as a "data set", "data bit representing a digital word", "feature set" or "program code", terms which are to be considered as equivalent and which are used interchangeably in this application.

One fundamental problem associated with this approach is the massive amount of data processing which can be required to establish a reasonably reliable signature.

Attempts at reducing the amount of data processing necessary in establishing a signature have been explored in previous inventive attempts, but not to unimproveable degrees.

Consider for example the teaching of U.S. Pat. No. 4,230,990 (Lert, Jr. et al) in which the need for continuously sampling and then generating a signature for each minute segment of broadcast is reduced. In that invention a signature is generated only upon detection of certain cue signals which are broadcast, primarily, in addition to the informational content of the program. The problem inherent in applying the teaching of that patent to field editing is that its use depends upon consistency in the format in which broadcasts are assembled, i.e., the broadcasts contain the existence of dead air between programs, a certain specific program logo be broadcast, or that programs contain a voluntarily superimposed code. However, none of these cues are inherently necessary in any particular broadcast. Obviously, as broadcasters may or may not find the field editing of their program content beneficial to their particular interest, no reliance can be made on the existence of any particular element of broadcast transmission not essential to the informational content of the broadcast program.

Another aspect of the applicant's previous invention (U.S. Pat. No. 4,420,769) is that generation of and programming the digital words associated with unwanted program material occurs concurrently with initial receipt of such material. A useful improvement, therefore, would be the providing of one or more means for programming the device for editing all unwanted material, including first transmissions thereof.

A further aspect of the applicant's previous invention is that program material is discussed as having been transmitted in analog form. Such signals, however, are inherently subject to degradation from outside interference and decay of signal strength, whereas transmissions in digital form are not. It is expected, therefore, that at some time in the future, broadcasters will replace the current analog format with a digital transmission.

A further useful improvement, therefore, would be simplified capability for processing digitally transmitted signals.

SUMMARY OF THE INVENTION

Accordingly, one object of the present invention is to provide an economically improved and novel method and system for the automatic editing of broadcast program material at the receiver.

An additional object is to provide a novel and improved method and system for the automatic editing of broadcast program material which reduces the amount of data processing required.

A further object is to provide such method and system with a capability for the acceptance of remote programming.

A still further object is for successful operation of such method and system not to be dependent on any uniform format for the assembly of program content and that it thus be relatively immune from faulty operation due to manipulation of broadcast content.

Another object is for such method and system to be compatible for use with broadcasts made in digital form.

An additional object is for such device to provide optional means for the operating other apparatus, such as, but not limited to, the pause feature of a recording device in conjunction with, or instead of, the editing of program material content.

These and other objects are achieved by the present method and system for the automatic editing of broadcast program information wherein an improved program recognition process is placed at a location remote from one or more receivers intended to display edited program content, (henceforth for the sake of simplicity referred to as "edited local displays"). Unedited program content is simultaneously received at both the remote location and at the edited local display(s) as broadcast. It is processed at the remote location for content analysis and an encoded control signal is sent to one or more source selection switches incorporated into the reception circuitry of one or more edited local displays. Control signal processing circuitry, located with the edited local displays, is provided to receive and decode the transmitted control signal, determine the editing or other control to be accomplished and thereby the appropriate positioning of the source selection switch(es), cause the switch(es) to be positioned accordingly and thus the desired editing and/or control to occur. Improvements to previous inventions of methods and/or systems for program recognition are also made. Although in actual usage any one or combination of the improvements may be employed, all are incorporated in the preferred embodiment and are described herein:

(a) a system for automatically identifying program features improved by the addition of one or more of the following:

(1) a sub-system for monitoring the content of unedited program transmission and the detection of trigger or cue sub-signals contained therein.

(2) a sub-system for monitoring the content of unedited program transmission, detecting sudden changes in program content, such as, in television reception, changes in scene not necessarily separated by blank frames, and recognizing such changes as trigger or cue sub-signals.

(3) means for automatically sampling, analyzing and categorizing the program information features upon the receipt of said trigger or cue sub-signals, and then generating signals which correspond to the program features analyzed.

(b) a system for manually identifying program features contained in unedited broadcast reception including in combination:

(1) human monitoring of unedited broadcast content;

(2) means for manually analyzing and categorizing the program information content of the monitored signal and generating signals which correspond to the program features analyzed.

(c) improved means for programming the categorizing of the sampled broadcast information comprising any one or more of the following:

(1) means allowing the incorporation of preprogrammed control or memory modules.

(2) means for receiving and incorporating control or memory information which has been generated offsite and transmitted to program identification system(s).

(3) means for the sampling of program features and simultaneously (1) causing appropriate operation of a source selection switch and (2) programming the automatic program identification system(s) for recognition of subsequent repeat broadcasts of the features sampled.

Other objects and advantages of this invention reside in the details of the construction and operation of the above and other means and embodiments as are more fully hereinafter described and claimed, reference being had to the accompanying drawings wherein:

BRIEF DESCRIPTION OF THE INVENTION

Figure 1:
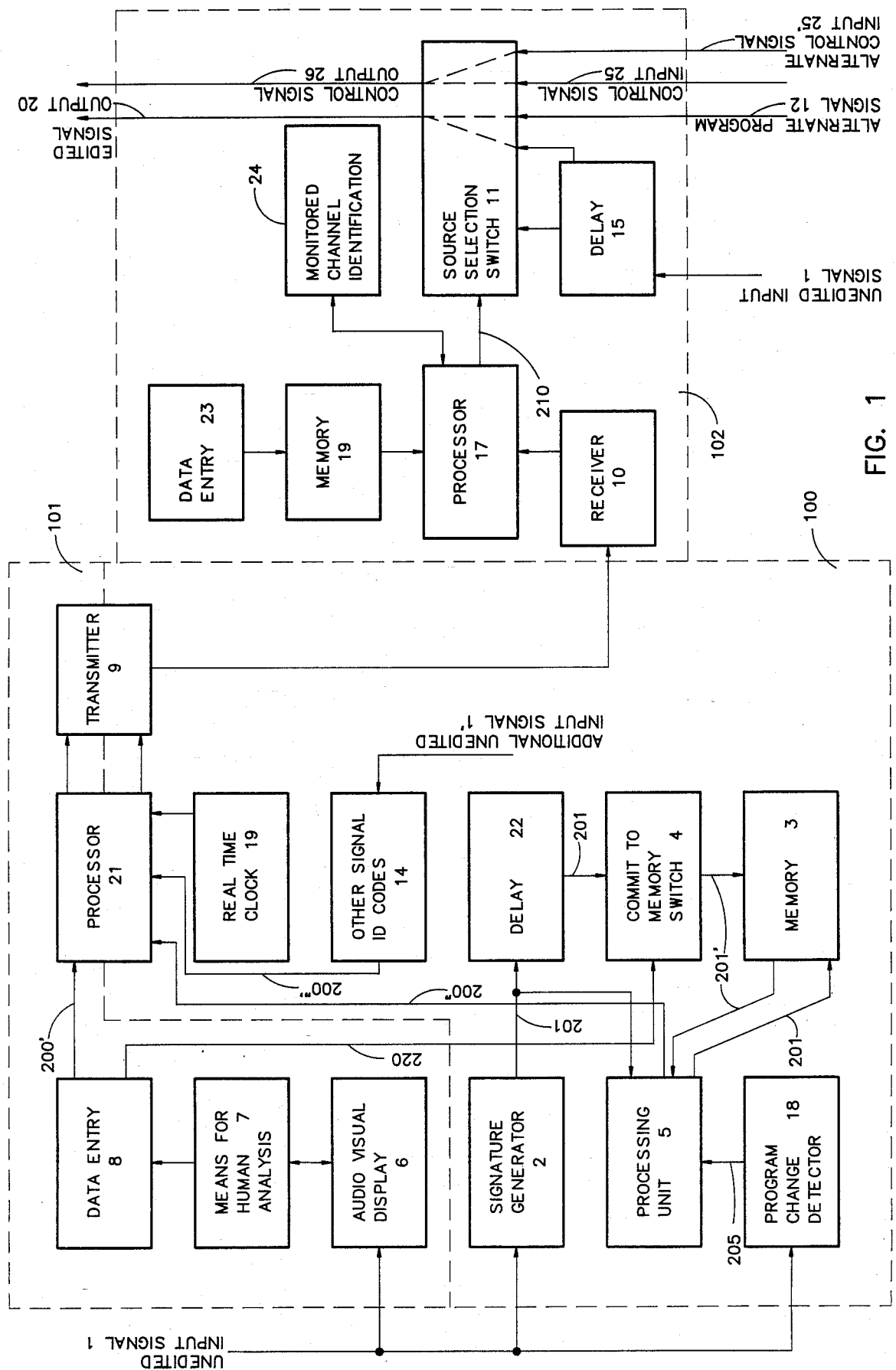
FIG. 1 is a block diagram of the preferred embodiment of this invention.

The basic system for the invention as shown in FIG. (2) includes input signals (1) containing unedited program material; automatic (100) and/or manual (101) systems for determining the program content of the unedited signals and generating one or more identification codes corresponding to that content (200); means for transmitting (9) the identification code(s) generated to a receiver (10) arranged for receiving such transmissions; a signal output (20) which is normally connected to the input signal (1), a switch (11) for editing the content of the signal output (20) by disconnecting signal output (20) from the unedited signal (1); and an enabling signal (210) generated by receiver (10) for controlling the operation of switch (11), and which is sent to the control input of switch (11),causing the operation of that switch (11) to correspond to the code or codes (200) received by receiver (10).

DETAILED DESCRIPTION OF THE INVENTION

As shown in FIG. 1, in the preferred embodiment, input signals (1) containing unedited program material are input to both manual (101) and automatic (100) systems for determining the program content of the input signals (1) and generating identification code(s) (200) which correspond that content; wherein the automatic system (100) comprises a signature generator (2) for sampling the content of the unedited input signals (1) and generating discrete signatures (201) which correspond to that content; a memory (3) for storing certain signatures (201') selected from those generated by the signature generator (2), along with classification information corresponding to those signatures; a commit to memory switch (4) for selecting the specific signatures to be stored; a processing unit (5) for comparing subsequent output (201) of the signature generator (2) with the content of memory (3) and for determining the classification of, and identification code (200") associated with the subsequent signatures (201).

These components are interconnected as follows: unedited program input signals (1) are sent to signature generator (2), the signature output therefrom is connected to processing unit (5) and, via switch (4) to memory (3). Interconnection is made between processing unit (5), memory (3) and signature generator (2), and the units are themselves arranged so that the processing unit (5) will compare signatures (201) generated by signature generator (2) with the signatures and corresponding classification codes previously stored within memory (3) and determine, by the presence (or absence) of matches existing, within a predetermined tolerance, between the presently generated signature and those within memory (3), the classification code of the program content from which the present signature was generated. That is, it will "recognize" certain program content of the unedited signal (1) and generate the corresponding identification code (200") for it.

While it is possible for signatures (201) to be generated for very minute segments of input signal, i.e., for each individual video frame of a television broadcast, in actual practice program segments to be edited will characterized by program (or scene) changes and will each be several seconds or minutes long. Further, as each program segment can be identified by a single signature it can be appreciated that the data processing required of processing unit (5) will be substantially reduced by generating only one signature per program segment. In the preferred embodiment this is accomplished by means of a program change detector (18) which detects changes in input signal (1) value which occur in excess of a predetermined rate.

Figure 3:
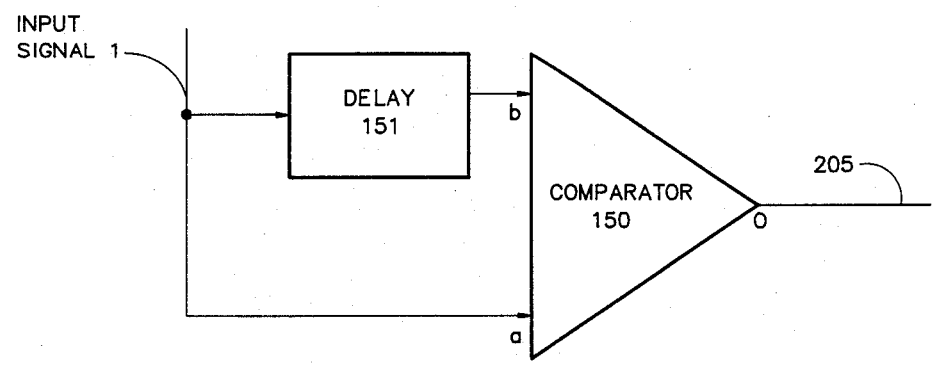
FIG. 3 shows a block diagram of an improved program change detector.

FIG. 3 shows a simple design for the program change detector 18. In this embodiment, input signal (1) is fed into a comparator (150), both directly to input "a", and through a delay (151) to input "b". Accordingly, the comparator will compare the present voltage of input signal (1) with the value of the voltage of input signal (1) a set time previous, and when the difference between the two voltages is found to exceed predetermined value (as would occur during a program change) cause the outputting of a control signal (205) at output (0).

Turning back to FIG. 1, control signal (205) is fed into processing unit (5) to control its operation so that signature (201) are processed only upon its presence.

It can be readily appreciated that the generation of identification code or codes (200") can be performed by more than one method. For example, the signatures stored within memory (3) may have appended to them corresponding code identification data or, alternately, memory (3) may consist of one or more sub-memories, wherein all signatures stored within a particular sub-memory are members of the same identification code.

It is also well to note that the purpose of commit to memory switch (4) is essentially one of programming the broadcast content to be recognized, and for which identification codes (200") will be generated by processing unit (5), by determining the signatures to be stored within memory (3). However, it should be noted that memory (3) may also be programmed by means other than shown in this embodiment, such as, for example, during manufacture, as a unit to be field inserted in system (100) or, in coordination with a receiver arranged to receive programming instruction which has been transmitted from another location. Further, as detailed above, memory (3) may embody one or more different structural formats. Thus the specific structure and/or mode of operation, as well as the need for, commit to memory switch (4) will be determined by the specific memory (3) and/or programming means employed, as well as the number of different codes to be generated. In the preferred embodiment shown in FIG. 1, memory (3) is programmed by sending an enabling output (220) from data entry (8) to the control input of commit to memory switch (4). Additionally, in the preferred embodiment delay (22) is interconnected between signature generator (2) and commit to memory switch (4) to delay receipt by switch (4) of signatures (201) by a predetermined length of time equal to the total time necessary for analysis (7) and input into data entry (8) to occur.

Without the incorporation of delay (22) the signature sent to memory (3) would not correspond to the beginning of the associated program segment of input signal (1) and thus, incomplete editing would occur.

Also in the preferred embodiment, the system employs a manual system (101) for generating desired program content identification code or codes which comprises an audio and/or visual display (6) at which unedited program signals (1) are monitored; means (7) for human analysis of the program content of those signals (1) and generating the corresponding identification codes (200'), and a key pad, or other means of data entry (8), for humanly entering the program content identification codes (200') generated.

These components are interconnected as follows: unedited program input signals (1) are sent via interconnection to audio/visual display (6) for monitoring. Program content codes (200') subsequently generated are inputted to data entry (8).

Figure 2:
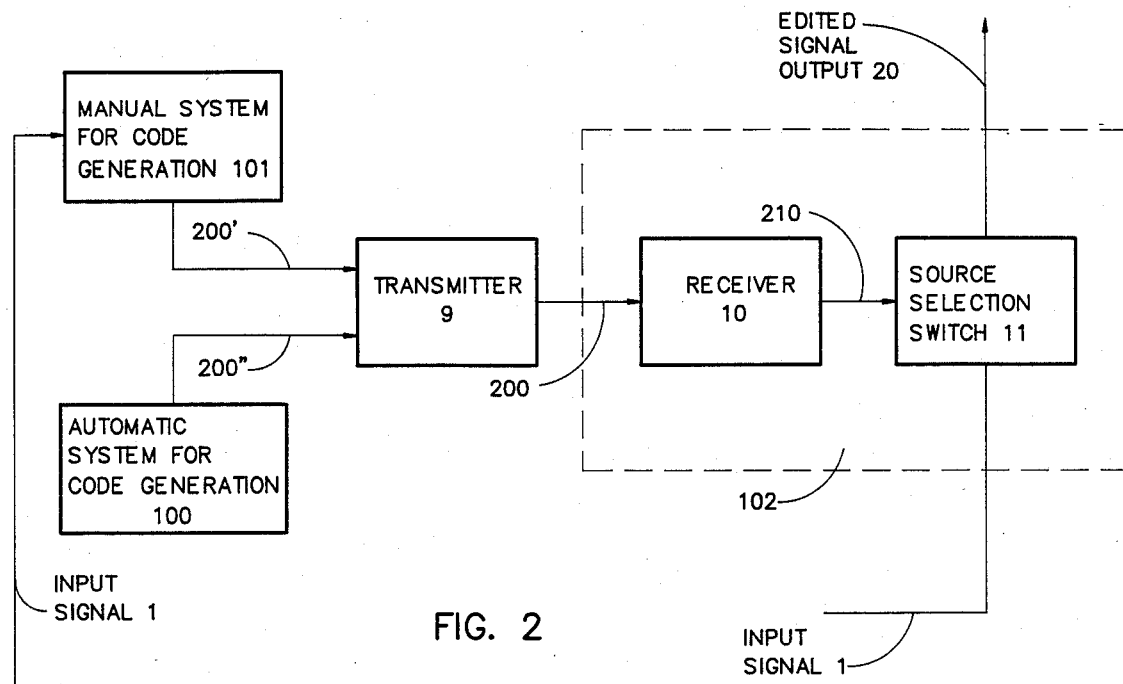
FIG. 2 shows a generalized block diagram of the invention.

In the preferred embodiment, several unedited signals are processed simultaneously, as would be the case if several television channels were to be edited concurrently, by incorporating additional manual and automatic systems for determining the other program content identification codes (14), one set for each additional input signal (1') to be processed. The additional identification codes (200"40 ) which correspond to the additional input signal(s) (1') are input to processor (21) which is also connected to, and receives the identification codes generated by the manual (101) and/or automatic (100) systems for code identification code operation for input signal (1). The purpose of processor (21) is to gather and organize the codes it receives (200' and/or 200" and/or 200''') into proper sequence for transmission to one or more editing system(s) (102), so that interference does not occur between individual codes. The output of processor (21) is connected to transmitter (9) which transmits code or codes (200) to one or more receiver(s) (10), which, as is shown in the generalized block diagram of FIG. 2, is/are connected to the control element of source selection switch (11) so that source selection switch (11) will be made to operate in coordination with receipt of the identification code or codes, (200' and/ or 200" and/or 200'''; shown collectively as 200).

In other embodiments, transmitter (9) and receiver (10) can be eliminated by hard wiring the code generators to editing apparatus (102). However, the associated transmit/receive functions must remain for operation of the system; that is the identification codes generated must be received by the editing system (102) for its proper operation. Similarly, neither the additional signal identification codes (14) nor processor (21) are necessary for operation of this invention. Their inclusion is preferred, however, as they greatly add to the efficiency and usefulness of the invention.

In addition, some embodiments will not require a capacity for multiple identification code generation. In those embodiments only a single aspect of program content is recognized and thus generation of only one identification code (200) is required.

In the preferred embodiment, however, multiple identification code (200) generation and processing capacity is provided as it greatly enhances the utility of the system. Consider that one or more editing systems (102) may be arranged to receive transmissions of identification codes (200), and that the editing desired can vary from system to system, as would occur when multiple households are using the system and are turned to different programs, or when tuned to the same program, desire the editing of different aspects of that program. Accordingly, the preferred embodiment shown in FIG. 1 provides generation and processing of multiple identification codes (200) which are transmitted to one or more editing systems (102).

As shown in FIG. 2 editing system (102) may consist simply of a source selection switch (11) which provides an edited signal output (20) and is interconnected to receiver (10) to receive enabling signals (210) transmitted from receiver (10) at the switch's control input, and unedited program input signals (1). Source selection switch (11) is arranged so that it can connect or disconnect edited signal output (20) to or from input signal (1) upon receipt of an enabling signal (210) and will thereby accomplish editing of the program content of the unedited program input signal (1) according to the command of enabling signal (210) sent by receiver (10) upon receipt of an identification code (200) by the receiver (10). The preferred embodiment, however, includes one or more of the following improvements, which are described in detail separately below: capability for switching output (20) to an alternate signal (12); capability for switching output (20) to an alternate signal (12); capability for receiving multiple identification codes (200) and selecting, from among those codes, one or more specific codes for operating source selection switch (11); a delay (15) for delaying receipt of the unedited signal (1) by source selection switch (11); and a source selection switch (11) which can control operation of one or more accessory devices, in addition to, or instead of, the program editing function of this switch.

As shown in section 102 of FIG. 1, capability for switch (11) to output an alternate signal (12) is provided by also inputting alternate signal (12) to a source selection switch (11) which has been arranged to switch its output between the unedited program signal (1) and the alternate signal (12) as commanded. Similarly, capability for control of one or more accessory devices is accomplished by providing one or more control signal inputs (25) and outputs (26) at the switch (11) and providing appropriate switching capability between those control input/outputs. An alternate control signal input (25') has been shown on FIG. 1 of the drawing to indicate the switching capability of the source selection switch (11) in regard to accessory devices. It should be understood, however, that the signal input to alternate signal input (12) and/or the signal inptu at laternate control signal input (12') may in some embediments comprise a zero value signal, i.e., no signal, such as when it would be desired to replace the portions to be deleted from unedited broadcast signal (1) with no other program material. In the case of the control signal, input at control signal input (25), this would be useful, for example, when the auxiliary device was meant only to operate during receipt of program material to be deleted, i.e., the pause control of a VCR. Accordingly, throughout this description, the term 'signal', in its various formats described is used generically, without being intended to mean the requirement of an actual signal presence in all possible embodiments of this invention.

To provide editing system (102) with capability for differentiating between multiple identification codes and operating source selection switch (11) only upon receipt of selected codes, memory (16) is connected to processor (17), which has been interconnected to and between receiver (10) and source selection switch (11). In operation under this mode, program components are categorized and given one of multiple program identification codes (200) according to the category in which they fall, either by the automatic (100) or manual (101) means of code generation, or both. For example, commercials are given code "A", entertainment shows for children code "B", entertainment shows for adults code "C", news programs code "D" and so on. Further, code "A" may be further subdivided and given additional code elements to identify the channel over which broadcast; the type of the product advertised and so on. Similarly codes "B", "C" et al can be also subdivided according to sub-elements contained within the general category of each. Codes corresponding to program elements which are to be edited such as, for example, all adult entertainment shows and all automobile commercials are then entered into memory (16) via programming data input (23). In operation, processor (17) will then compare the identification codes (200) sent to it by receiver (10) with those in memory (16) and, upon finding a match, send an enabling signal (210) to the control input of source selection switch (11) and to cause the appropriate operation of that switch.

Figure 4:
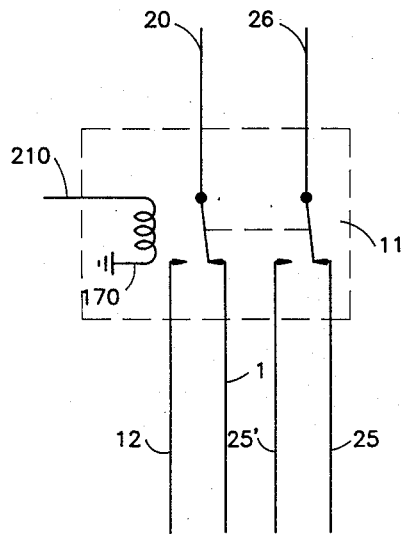
FIGS. 4 and 5 show two types of source selection switch which may be used in the invention.
Figure 5:
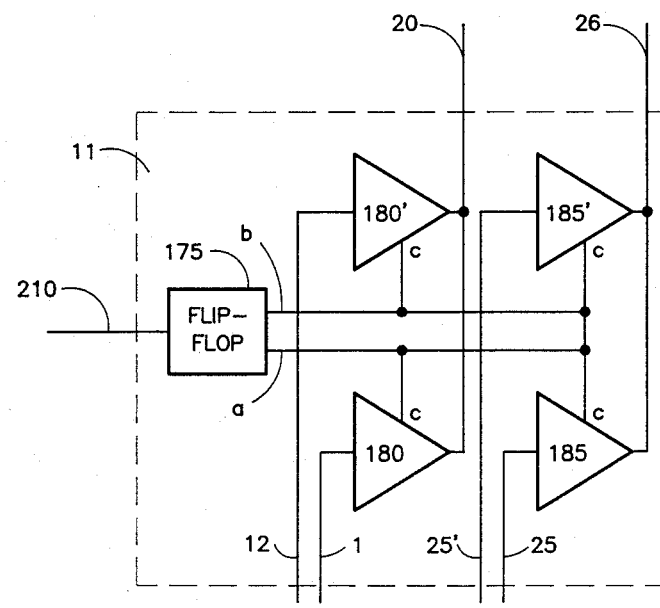

FIGS. 4 and 5 show two examples of types of switch configuration which may be used for source selection switch (11). In FIG. 4, a DPDT relay is shown, wherein contact m-o and m'-o' are normally open whereas n-o and n'-o' are normally closed. However upon energization of coil (170), contacts m-o and m'-o' will close, and contacts n-o and n'-o' will open.

In FIG. 5, a solid-state means for accomplishing switching is shown, in which enabling signal (21) is sent to the control input of a flip-flop, (175). Flip-flop (175) will then output through either output a or b, corresponding with the state of signal (210), to the enabling inputs c of either both gates (180) and (185), or both (180') and (185') respectively. When gates (180) and (185) are open, gates (180') and (185') are closed, and vice-versa.

In operation, unedited input signal 1 is sent to contact n of the FIG. 4 relay, or input to gate (180') of the FIG. 5 solid state unit. Similarly, alternate signal (12) is input to contact m, or gate (180); control signal (25) is input to contact n', or gate (185'); and alternate control siginal (25') to contact m', or gate (185).

Thus, outputs (20) and (26) will normally be connected to inputs (1) and (25) respectively. However, enabling signal (210) will cause outputs (20) and (26) to be disconnected from inputs (1) and (25) and connected to inputs (12) and (25').

In the preferred embodiment, the operation of source selection switch (11) is also governed by the channel being monitored so that, for example, broadcast of an unwanted program segment over channel 2 would not cause editing of other channels to occur. As shown in FIG. 1, this is accomplished by sending monitored channel identification (24) to processor (17), but can also be accomplished in other embodiments by using multiple source selection switches (11), one for each channel to be monitored, and sending monitored chanel identification (24) to the multiple switches and arranging their operation so that only the switch (11) appropriate for the channel being monitored will cause editing to occur.

In the preferred embodiment delay (15) is also provided. This element is interconnected between unedited input signal (1) and source selection switch (11) and is arranged so that it will delay transmission of unedited program signal (1) to the source selection switch (11) for a predetermined length of time, which length is equal to the time necessary for the unedited program signal (1) to be analyzed and source selection switch (11) caused to operate, so that no unwanted program material will be transmitted through source selection switch (11) during the time necessary for its recognition.

It is to be observed that the elements disclosed are substantially standard equipment which need not be specifically illustrated for those skilled in the art and, by themselves, form no part of the present invention outside of the system disclosed. Further, the specific operating characteristics of each element required is affected by the construction and design of the other components with which the respective element must work. For example, the designs of processors (21) and (17) and to a lesser extent, transmitter (9) and receiver (10) are interdependent: processor (21) may operate by either multiplexing or by sequentially outputting multiple identification codes (200); the design of processor (17) and the other related components must be compatible with the method employed. Similarly the design of source selection switch (11), processor (17) and the method of providing monitored channel identification are also interdependent as previously discussed. For example a latching relay used as source selection switch (11) will switch between inputs with a pulsed output from processor (17) while other families of switch may require continuous control outputs from the processor.

While the above description contains numerous specifities, these should not be construed as limitations on the scope of the invention, but rather as an examplification of one preferred embodiment thereof. Many other variations are possible, for example a real time clock (19) may be employed to provide time of day information at processor (21) as shown in FIG. 1, or at processor (17), and the operation of switch (11) be made to have dependency on real time. Accordingly, the scope of the invention should not be determined not by the embodiments described or illustrated but by the appended claims and their legal equivalents.

I claim as new and useful in this invention the following items:

1. A system for the editing of program material contained in broadcast signals, comprising in combination:
   at least one editing control signal generation means comprising:
      means for monitoring a selected unedited broadcast signal and generating an editing control signal which corresponds to the program content contained within said selected unedited broadcast signal being monitored;
      transmitting means for transmitting said editing control signal;
   at least one means for editing the content of said selected unedited broadcast signal being monitored, said editing means comprising:
      an output normally connected to an input of said selected unedited broadcast signal, and which can be disconnected from said input of said selected unedited broadcast signal;
      switching means for switching said output from being connected to said input and disconnected from said input;
      and switch operation means to cause operation of said switching means to correspond to the program content contained within said selected unedited broadcast signal, and wherein said switch operation means comprises:
         receiving means for receiving from said transmitting means said editing control signal and causing operation of said switching means to correspond to the information contained within said editing control signal being received pertaining to the program content contained within said selected unedited broadcast signal being monitored;
      and means for at least one said editing control signal generation means to operate independently of the content of the signal at said output.

2. The System of claim 1 wherein said at least one editing control signal generation means comprises means for automatically monitoring a selected unedited broadcast signal and generating a segment of said editing control signal which corresponds to the program content contained within said broadcast signal being automatically monitored.

3. A system for the editing of program material contained in broadcast electrical signals according to claim 1, wherein said editing control generation means includes means for programming the operation of said editing control generation means as to allow editing to occur during the first and each subsequent monitoring of said broadcast signal being monitored.

4. A system for the editing of program material contained in broadcast signals, comprising in combination:
   at least one editing control signal generation means comprising:
      means for monitoring a selected unedited broadcast signal and generating an editing control signal which corresponds to the program content contained within said selected unedited broadcast signal being monitored;
      transmitting means for transmitting said editing control signal;
   at least one means for editing the content of said selected unedited broadcast signal being monitored, said editing means comprising:
      at least one auxiliary control signal output for providing control of auxiliary equipment;
      at least one output normally connected to a primary said selected unedited broadcast signal, and which can be alternately disconnected from said primary said selected unedited broadcast signal and connected to a secondary broadcast signal;
      broadcast signal switching means for switching said output between said primary input and said alternate broadcast signal input;
      auxiliary control signal switching means for adjusting said at least one auxiliary control signal output;
      and switch operation means to cause operation of said auxiliary control switching means, and said broadcast signal switching means to correspond to the program content contained within said selected unedited broadcast signal, and wherein aid switch operation means comprises:
         receiving means for receiving from said transmitting means said editing control signal and controlling operation of said auxiliary control signal switching means and said broadcast signal switching means with the information contained within said
         editing control signal being received pertaining to the program content contained within said selected unedited broadcast signal being monitored;
      and means for at least one said editing control signal generation means to operte independently of the content of the signal at said output.

5. A system for the editing of the content contained within broadcast signals comprising in combination:
   at least one identification code;
   at least one encoded editing control signal containing at least one said identification code; at least one monitoring-encoding means for automatically monitoring the content of a selected broadcast signal and encoding at least one said encoded editing control signal according to the content of said selected broadcast signal being monitored;

transmitting means for transmitting at least one said editing control signal to at least one external editing means, wherein said external editing means comprises:

at least one broadcast signal output, said broadcast signal output normally connected to a primary input consisting of said selected broadcast signal being monitored;

at least one switching means to disconnect said broadcast signal output from said primary input;

and at least one switch operation means to cause the operation of said switching means and thereby cause the editing of content from said selected broadcast signal; wherein said switch operation means comprises:

at least one primary identification code;

programming means for selecting said primary identification code for storage within at least one memory means;

receiving means for receiving said encoded editing control signal, including said identification code contained therein;

processing means for comparing said identification code obtained from said encoded editing control signal being received with said primary identification code contained within said memory means and obtaining an enabling output from said processing means when said identification code being compared and said primary identification code being compared match within a predetermined degree;

and transmitting means for transmitting said enabling output to, and operating, said switch operation means.

6. A system for the editing of program material contained in broadcast electrical signals according to claim 5, wherein said monitoring-encoding means includes means for programming the operation of said monitoring-encoding means as to allow editing to occur during the first and each subsequent monitoring of said broadcast signal being monitored.

7. A system for the operation of an auxiliary device corresponding to the program material contained in broadcast signals, comprising in combination:

at least one enabling generation means comprising:

means for automatically monitoring a selected broadcast signal and automatically generating an enabling signal which corresponds to the program content contained within said selected broadcast signal being automatically monitored, and wherein said means for automatically monitoring and automatically generating said enabling signal includes;

means for deriving at least one signature corresponding to the program content contained within said selected broadcast signal being monitored;

memory means for storage of at least one selected signature therein;

means for comparing said signature corresponding to the said selected broadcast signal being monitored with said at least one selected signature in storage;

and means for generating said enabling signal, wherein the said enabling signal generated corresponds to the product of said comparison;

transmitting means for transmitting said enabling signal;

at least one means for controlling the operation of an auxiliary device, said means for controlling the operation of an auxiliary device comprising:

at least one auxiliary control signal output for providing control of said auxiliary device;

auxiliary control signal switching means for adjusting at least one said at least one auxiliary control signal output;

and switch operation means to cause operation of said auxiliary control switching means, to correspond to the program content contained within said selected broadcast signal, and wherein said switch operation means comprises:

receiving means for receiving from said transmitting means said enabling signal and controlling operation of said auxiliary control signal switching means with the information contained within said enabling signal being received pertaining to the program content contained within said selected broadcast signal being monitored.

8. The System of claim 7 where said at least one enabling signal generation means comprises means for manually monitoring a selected broadcast signal and generating said enabling signal which corresponds to the program content contained within said broadcast signal being manually monitored.

* * * * *